Patented Feb. 8, 1949

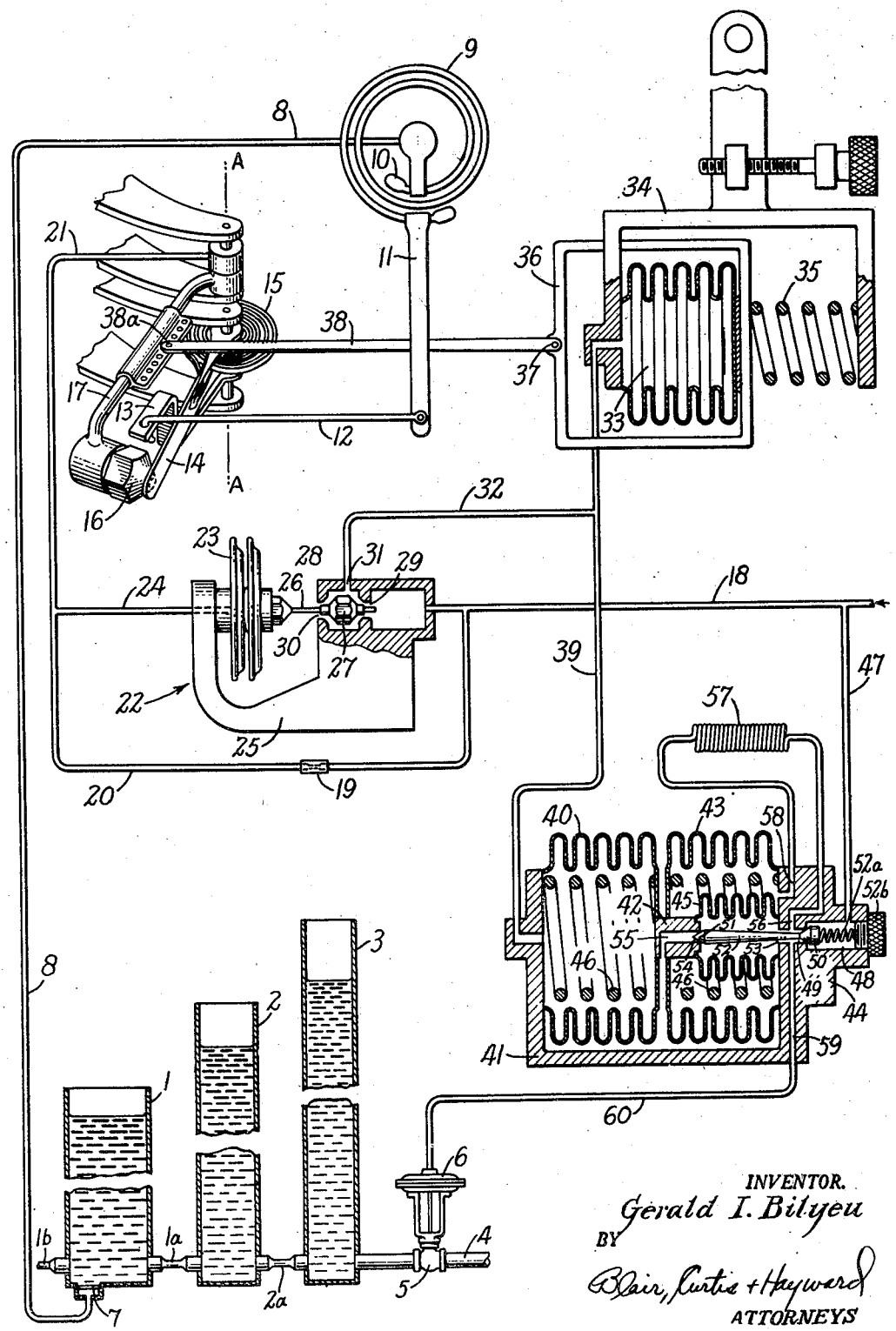

2,461,026

UNITED STATES PATENT OFFICE 2,461,026

DIFFERENTIATOR

Gerald I. Bilyeu, Foxboro, Mass., assignor to The Foxboro Company, Foxboro, Mass., a corporation of Massachusetts Application January 6, 1944, Serial No. 517,261

1 Claim. (Cl. 137—153)

This invention pertains to apparatus for controlling a variable condition such as temperature or liquid level by regulating a variable affecting the condition, preferably so as to tend to maintain the variable condition at a desired value.

An object of the invention is to provide ancillary apparatus that may be added conveniently to present standard controllers to add to the controllers an additional control function.

Pneumatically operated controllers of the proportioning type, and of the proportioning-plus-floating type (sometimes called "proportioning with reset") such as shown in the Mason patent, Re. 20,092, have an output control pressure which is normally either conducted to a diaphragm motor operating a control valve or to some secondary controller in which the said output pressure adjusts the control point of the secondary controller.

It is another object of the present invention to provide an ancillary device which superimposes upon the output control pressure of the controller an additional control effect so that, for example, the action of the diaphragm motor instead of being governed by the action of the controller proper is further modified by the ancillary mechanism.

Other objects of the invention will be in part obvious and in part pointed out as the description proceeds.

In the drawings, the figure is a diagrammatic representation of a proportioning controller, the output pressure of which goes to an ancillary mechanism diagrammatically shown, which ancillary mechanism in transmitting control pressure to a diaphragm motor operating the control valve modifies the control pressure.

Referring to the drawings, in the upper part thereof is diagrammatically shown a proportioning controller such as is disclosed in the above-mentioned Mason patent. In the lower part of the drawing is shown ancillary control mechanism embodying the invention.

The control problem is diagrammatically shown as that of controlling the liquid level in an open tank 1 by regulating the flow of liquid through a pipe 4 by means of a control valve 5 operated by a diaphragm motor 6. The liquid flowing through the pipe 4, before reaching tank 1, passes into an open tank 3 which is connected by pipe 2a with an open tank 2, which in turn is connected through a pipe 1a to a tank 1. The pipes 1a and 2a have restrictions so that, in order for the liquid to flow from the tank 3 to tank 2, the level in tank 3 must be higher than in tank 2, and in order to flow from tank 2 into tank 1 the level in tank 2 must be higher than in tank 1. Liquid flows from the tank 1 through a restriction 1b. The restriction 1b is assumed to be variable arbitrarily, and variation of this restriction changes the demand on the process. If the restricting effect of the restriction becomes less, then more liquid has to flow into tank 1 in order to keep the liquid level at the desired value. Conversely, as the restrictive effect of the restriction increases, less liquid must flow into the tank 1 in order to keep the liquid level constant. The reason for this is that for liquid level in the tank 1 to remain constant, the amount of liquid flowing out of the tank must equal the amount flowing into it, and for a given liquid level in the tank the flow out will vary in accordance with the variation of the restrictive effect of the restriction 1b.

The liquid level in the tank 1 is measured by the hydrostatic pressure exerted on a diaphragm 7, and this pressure is transmitted through tubing 8 to the fixed inner end 10 of a conventional hollow spiral measuring element 9. The outer end is free to move, and variation in the pressure causes the free end to move proportionately. The free end of the measuring element is connected by an extension 11 and a link 12 to a freely movable flapper operating arm 13, pivoted about an axis A. A flapper 14 freely pivoted about the same axis A is urged against the flapper operating arm by a hair spring 15. This construction is the same as described in the Mason patent and is such that the flapper 14 is freely positioned by the measuring element 9 in accordance with the value of the liquid level in the tank 1.

The flapper 14 is part of a nozzle flapper pilot valve. The nozzle is shown at 16 and is supported from a hollow tube 17 freely pivoted about the axis A. The nozzle is supplied with a restricted air flow from the supply pipe 18, a restriction 19 in pipe 20 which is connected with a pipe 21, which is connected through a suitable hollow bearing to the hollow supporting member 17. The bearing is made substantially air-tight, but at the same time permits free pivoting of the supporting arm 17 and the nozzle 16 about the axis A.

The nozzle 16 is made quite small and the flow of air supplied to the nozzle through the restriction 19 is also small so that the jet of air issuing from the nozzle against the baffle 14 is small. However, relative movement of the flapper 14 with respect to the nozzle, when the two are not spaced more than a fraction of a thousandth of an inch, causes variation of pressure in the pipe 21 back of the nozzle. The closer the flapper is to the nozzle, the higher the pressure in the pipe 21, and vice versa. But if the flapper were to be spaced from the nozzle more than this fraction of a thousandth of an inch, then the pressure in the pipe 21 would drop to a minimum value. When the nozzle and flapper are in the relationship of not being spaced by more than a fraction of a thousandth of an inch, the nozzle is said to be tangent to the baffle.

Variation of the pressure in pipe 21 serves to operate a relay valve generally indicated at 22. This valve 22 comprises a bellows 23 connected through pipe 24 to the pipe 21, and so to the pressure back of nozzle 16. The left end of the bellows 23 is fixed to and supported by a frame 25. The right end of the bellows is free to move and, because of the spring characteristic of the bellows, assumes positions corresponding to the pressure in the pipe 21 and so is responsive to pressure variations caused by relative movement between the nozzle and the flapper. This free end of the bellows 23 carries a valve stem 26 which supports and operates a valve head 27. The valve head 27 operates in a chamber 28, having an inlet port 29 connected to the supply pipe 18, an exhaust port 30 to atmosphere (and through which the valve stem 26 extends), and an outlet port 31 to which pipe 32 in connected. This chamber 28 is supported by the same frame 25 that supports the relay bellows 23.

The operation of the relay valve may be traced as follows: As pressure in the relay bellows 23 increases, it moves the valve head 27 toward the right, thereby decreasing the supply port opening 29 and increasing the exhaust port opening 30 so that the output pressure in the pipe 32 decreases. As the pressure in the bellows 23 decreases it moves the valve head 27 to the left, further opening the inlet port 29 and closing the exhaust port 30, thereby increasing the pressure in the pipe 32.

The pipe 32, which is the output pressure of the relay valve, is connected to the interior of a bellows 33 which will be called a proportioning bellows. The left end of the proportioning bellows is fixed to one end of a yoke-shaped frame 34, and the right end of the bellows is free to move against the action of a compression spring 35. Between the free end of the bellows 33 and the compression spring 35 is a plate secured to a freely movable frame 36. With this construction, pressure variations in the bellows 33 cause the free end of the bellows, and consequently the frame 36, to assume positions corresponding to the pressure existing in the bellows. As the pressure in the bellows 33 increases, the frame 36 is moved proportionately to the right, and vice versa.

The frame 36, at 37 is connected by a rod 38 to a frame on the nozzle support 17 as shown in the Mason patent.

With this construction as described in the Mason patent, as the measuring element 9 moves the flapper 14, the controller operates to cause the nozzle 16 to follow and remain tangent to the flapper 14, and the air pressure in the pipe 32 at all times changes in proportion to changes of the position of the measuring element. Consequently, as the liquid level in the tank 1 varies, the pressure in the pipe 32 varies in proportion to it.

As described in the Mason patent, this proportionality may be adjusted by changing the connection 38a between the connecting rod 38 and the nozzle support 17. Also as described in the Mason patent, the range of liquid level change at which the controller will respond may be adjusted by shifting the frame 34 to the right or to the left.

In commercial practice, the output pressure of the controller is the pressure in the pipe 32, and would normally be conducted to the diaphragm motor 6, so that as the liquid level in the tank 1 fell, the output pressure of the controller would increase and cause diaphragm motor valve 6 to further move the valve 5 proportionately. Such control action as described is normally referred to as proportioning control.

In a proportioning controller, the control valve 5 and the correction to the process are responsive solely to the change of the liquid level. If the liquid level for example, dropped an inch, the control valve 5 would move a proportionate amount. If the liquid level dropped two inches, the control valve 5 would move a proportionately greater amount and the flow through the pipe 4 would increase a proportionately greater amount.

There are instances in which the control action produced by a proportioning controller can be improved by superimposing on the proportioning control action what will be referred to as derivative control actions. A first derivative control action would be one which would make the control valve 5 move an amount proportionate to the rate at which the liquid level in the tank 1 was changing. Thus, with the derivative control action added to that of the proportioning action, the instant the liquid level started to drop at a given rate the derivative action would instantly move control valve 5 an amount proportionate to that rate. Then, as the liquid level continued dropping at the same rate, the proportioning action would continue to move the control valve.

When the liquid level stopped dropping the derivative action would immediately reverse the control valve action an amount proportionate to the previously imposed rate of liquid level change, but the proportioning action would thereafter hold the control valve 5 in the new position corresponding to the new liquid level value.

In the present embodiment, the controller output pressure in the pipe 32, instead of going to the diaphragm motor 36, is conducted to a pipe 39 to the inside of bellows 40. The left end of bellows 40 is fixed to and supported by a yoke-shaped frame 41. The right hand and free end of bellows 40 is connected by a movable ported connecting member 42 with the free end of a bellows 43, the left end of which is fixed to and supported by a base member 44 also supported by the yoke-shaped member 41.

Within bellows 43 is an inner bellows 45 secured at its free end to the member 42 and fixed and supported at its right hand end by the base member 44. The bellows 40, therefore, opposes the combined action of bellows 43 and 45.

Within bellows 40 and 43 is a compression spring system comprising springs 46, so constructed that when equal pressures exist in the three sets of bellows 40, 43, and 45, the member 42 is positioned at a neutral position. As will appear later, this mechanism operates to supply pressure to bellows 43 and 45 to balance the force exerted by the variable pressure in bellows 40 coming from the proportioning controller through the pipe 39.

The mechanism by which this balancing of forces is accomplished is as follows: Supply pressure from the pipe 18 is conducted by pipe 47 to a chamber 48 having an inlet port 49. A valve head 50 of a double-headed valve controls the flow of air through the inlet port 49. The inlet port 49. The inlet port 49 connects with a passage 53 which communicates with the interior of the small bellows 45. Hence, valve head 50 and the port 49 control the flow of air into the small bellows 45.

The exhaust of air from the bellows 45 to atmosphere is controlled by the other valve head 51 of the double-headed valve, and the valve head 51 is connected by valve stem 52 to the valve head 50. The valve head 51 in the bellows 45 operates in conjunction with an exhaust port 54 which is part of the member 42 and connects with a passage 55 in the member 42, which passage connects the exhaust port 54 with atmosphere. The valve heads 50 and 51, and the stem 52, are urged in a leftward direction by a small compression spring 52a abutting against a sealing cap 52b.

The action of this pilot valve system is as follows: If the force exerted by the pressure in bellows 40 exceeds the force exerted by the combined action of bellows 45 and 43 against the bellows 40, the connecting member 42 moves to the right of its neutral position and with the valve head 51 seated in the exhaust port 54 pushes on the valve stem 52 and moves the valve body 50 from the seat of the inlet port 49, permitting air to flow from the supply line 18 into bellows 45 to increase the pressure therein and so increase the force exerted by the bellows 43 and 45 until the member 42 is moved back to its neutral position, at which position the valve head 50 seats on the port 49 and stops further increase of pressure in the bellows 45. At this moment also, the valve head 51 is seated in the exhaust port 54 so that no air is flowing from the bellows 45 to atmosphere. If the force exerted by the bellows 40 is less than the force exerted by the bellows 43 and 45, connecting member 42 is moved to the left moving the exhaust port 54 away from the valve head 51 and permitting air to flow from the bellows 45 until the pressure therein reduces sufficiently to reduce the force exerted by bellows 43 and 45 to that exerted by bellows 40, at which time the connecting member 42 is moved back to its neutral position and the intake port 49 and the exhaust port 54 are again closed. It appears that with this construction when the connecting member 42 is in its neutral position, both ports 49 and 54 are closed and at no time are both ports opened.

The interior of the bellows 45 is connected with the interior of the bellows 43 through a passage 56 in the base member 44, a restriction 57, and a second passage 58 in the base member 44. If the pressure in the bellows 54 is above the pressure in the bellows 43, air will flow through the restriction 57 into the bellows 43; and, vice versa, if the pressure in bellows 43 is above that in bellows 45, the pressure will flow out of bellows 43 into bellows 45.

It is assumed that the combined effective area of the bellows 43 and 45 equals the effective operating area of the bellows 40—i. e., the area against which the pressure acts in exerting a force on the free ends of the bellows. Consequently, if it is assumed for the moment that there is a free connection between the interiors of bellows 43 and 45, then the pressure in the two bellows would always be the same, and that pressure would always (because of the action of the pilot valve) be equal to the pressure in the bellows 40. This is true because if the pressure in the bellows 40 tended to be higher than the pressure in the bellows 43 and 45, the free ends of the bellows would move the valve head 50 away from the inlet port 49 to supply more air to the bellows 43 and 45. It might be pointed out at this time that the action of the pilot valve is rapid, and that the pressure in the bellows 43 and 45, for all intents and purposes, changes instantly to exactly meet any change in pressure in the bellows 40.

The pressure in the bellows 45 is connected by a passage 59 and a pipe 60 to the diaphragm motor 6, and so becomes the output pressure of the entire control system, and the control pressure that goes to the diaphragm motor 6. Under the assumption that has just been made, that there is no restriction between the bellows 43 and 45— that their interiors are in free communication— the controller output pressure in the pipe 60 would always equal the received pressure in the pipe 39, and so would always change in proportion to changes in the liquid level in the tank 1 as described. Such operation, therefore, is straight proportioning control operation.

The derivative control action (by which the control valve is moved a definite amount in proportion to the rate of change of the liquid level) is added by providing the restriction 57 between the interiors of the bellows 43 and 45. Its operation may be traced as follows: Starting from an equilibrium condition in which the liquid level in the tank 1 is constant and the output pressure in the pipe 39 is constant, and the pressure in the bellows 40, 43, and 45, and 60 are all constant and of the same value as that of the pressure in the pipe 39—starting with this condition of equilibrium, it may be assumed that the liquid level in the tank 1 suddenly started dropping at a constant rate. This would mean that the measuring element 9 would start moving at a constant rate, and the pressure in the proportioning motor 33 would start increasing at a constant rate to hold the nozzle 16 tangent to the flapper 14. Therefore, the pressure in the pipe 39 and in the bellows 40 will increase at a contant rate. To balance this increasing pressure in the bellows 40, the pilot valve instantly causes the pressure in the bellows 45 to increase. But because the effective area of the bellows 45 is less than the effective area of the bellows 40, the pressure in the bellows 45 has immediately to increase above that of the pressure in the bellows 40 in order to hold the connecting member 42 in its neutral position, and has thereafter to keep on increasing but at the same rate that the pressure in the bellows 40 increases. Meanwhile, the pressure in the bellows 45, which is above the pressure in the bellows 43 because of the presence of the restriction 57, causes air to flow into the bellows 43 to increase the pressure therein at a rate proportional to the pressure difference between the bellows 45 and 43. The rate at which the pressure in the bellows 43 increases very shortly becomes equal to that at which the pressure in the bellows 45 is increasing and to that at which the pressure in the bellows 40 is increasing. In other words, bellows 43 and 45 combine their actions to keep the force exerted by them equal to the force exerted by the bellows 40 so as to keep the member 42 substantially in its neutral position. The amount that the pressure in the bellows 45 is above the pressure in the bellows 40 and is above the pressure in the bellows 43, depends upon how fast the pressure in the bellows 40 is increasing. If it is increasing very slowly then the pressure difference between bellows 45 and 43 is much lower because only a small pressure difference is needed to force the air through the restriction 57 into bellows 43 to keep the pressure therein increasing at the same rate that the pressure is increasing in the bellows 40. But if the pressure in the bellows 40 is increasing very rapidly, then in order to obtain the same rate of increase in the pressure in the bellows 43, the pressure in the bellows 45 must be much higher.

Therefore, the pressure in the bellows 45, which is also the pressure in the pipe 60, so long as the pressure in the bellows 40 has a rate of increase, is above the pressure in the bellows 40, and the amount that it is above the pressure in the bellows 40 is proportional to the rate at which the pressure in the bellows 40 is increasing. If now it is assumed that the liquid level in the tank 1 stops dropping, then the pressure in the bellows 40 will stop increasing, but will remain at its present value. When this happens, the pressure in the bellows 45 drops to a pressure equal to that in bellows 40, and the pressure in the bellows 43 increases to a pressure equal to the pressure in the bellows 40, as may be seen from the following operation.

The instant that the pressure in the bellows 40 stops increasing, the pressure in the bellows 45 is above that of the pressure in the bellows 40, and above that of the pressure in the bellows 43. Under these conditions, air continues to flow through the restriction into bellows 43 to increase the pressure therein, with the result that the combined action of the bellows 43 and 45 exerts a force greater than that exerted by the bellows 40, and the connecting member 42 moves to the left uncovering the exhaust port 54, reducing the pressure in the bellows 45, and in the pipe 60, until pressure in bellows 45 equals the pressure in bellows 43 and the pressure in the bellows 40. This action takes place very rapidly so that, for all intents and purposes, the moment the pressure in the bellows 40 stops increasing, the pressure in the pipe 60 and so in the diaphragm motor 6 decreases an amount proportional to the change in the rate of change.

The reverse of the above described action takes place when the liquid level in the tank 1 has a rate of increase giving the pressure in the bellows 40 a rate of decrease.

The operation of the pilot valve 50, 51, and 52, and the exhaust ports 49 and 54, is such that very small movements of the connecting member 42 are sufficient to completely cover or uncover the ports. Such a type of valve is well known and is commercially called a balanced supply and waste valve.

The amount that the pressure in the pipe 60 is increased or decreased above the pressure in the bellows 40 for a given rate of change of the pressure in the bellows 40 may be varied by changing the value of the restricting effect of the restriction 57 and/or by changing the effective capacity of the bellows 43 as by connecting a capacity tank with the bellows 43. In this way the amount of the derivative action may be adjusted to the particular process being controlled.

Additional derivative actions may be added by adding additional ancillary mechanisms as shown. Thus, if an additional ancillary mechanism is added, the pipe 60 instead of going to the diaphragm motor 6 would go to the bellows 40 of the additional ancillary mechanism and the output pressure of the additional ancillary mechanism would now go to the diaphragm motor 6. Such an additional ancillary mechanism would add a control effect that is proportional to the acceleration of the change of liquid level.

As many embodiments may be made in the above invention and as many changes may be made in the embodiment above described, it is to be understood that all matter hereinbefore set forth or shown in the accompanying drawings is to be interpreted as illustrative only and not in a limiting sense.

I claim:

A relay valve for producing a control pneumatic output pressure, comprising in combination, a bellows responsive to a variable pneumatic pressure, a second bellows opposing the force of said first bellows, a third bellows inside said second bellows also opposing the force exerted by said first bellows, a spring system biasing said bellows to a neutral position, and the sum of the effective areas of said second and third bellows being equal to the effective area of said first bellows, a source of air supply, a valve body controlling flow of air from said source of air supply through an inlet passage into said third bellows, a restricted passage connecting said second and third bellows, a second valve body fixed with respect to said first valve body and controlling exhaust of air from said third bellows through an exhaust passage to atmosphere, said exhaust passage being in a member movably carried by the opposing ends of said bellows and the inner end of said exhaust passage being so positioned with reference to said valve bodies and inlet passage that bellows movement in one direction causes it to be engaged and closed by said second valve body and further bellows movement in the same direction causes it to move said first valve body from its seat to permit ingress of air into said third bellows, and bellows movement in the opposite direction causes it to move said first valve body to close said inlet passage and further bellows movement causes said member to move away from said second valve body to permit egress of air from said third bellows, whereby the pressure in said third bellows is varied by supply and exhaust of air through said inlet and exhaust passages in response to change of pressure in said first bellows, and said control output pneumatic pressure being that in said third bellows.

GERALD I. BILYEU.

No references cited.